(12) United States Patent
Paillard (10) Patent No.: US 8,515,239 B2
(45) Date of Patent: Aug. 20, 2013

(54) METHOD AND DEVICE FOR ENCODING VIBRO-KINETIC DATA ONTO AN LPCM AUDIO STREAM OVER AN HDMI LINK

(75) Inventor: Bruno Paillard, Sherbrooke (CA)

(73) Assignee: D-Box Technologies Inc., Longueuil, QC (CA)

( * ) Notice: Subject to any disclaimer, the term of this patent is extended or adjusted under 35 U.S.C. 154(b) by 1291 days.

(21) Appl. No.: 12/326,917

(22) Filed: Dec. 3, 2008

(65) Prior Publication Data

US 2010/0135641 A1  Jun. 3, 2010

(51) Int. Cl.
*H04N 9/80* (2006.01)
(52) U.S. Cl.
USPC .............. 386/239; 386/E5.064; 700/94
(58) Field of Classification Search
USPC .................. 386/239, E5.064; 700/94
See application file for complete search history.

(56) References Cited

U.S. PATENT DOCUMENTS

| | | | |
|---|---|---|---|
| 5,270,480 A | 12/1993 | Hikawa | |
| 5,404,377 A | 4/1995 | Moses | |
| 5,486,141 A * | 1/1996 | Ohga et al. | 472/60 |
| 5,655,945 A | 8/1997 | Jani | |
| 5,822,360 A | 10/1998 | Lee et al. | |
| 6,091,773 A | 7/2000 | Sydorenko | |
| 6,178,185 B1 | 1/2001 | Marks | |
| 6,567,780 B2 | 5/2003 | Rhoads | |
| 6,733,293 B2 | 5/2004 | Baker et al. | |
| 6,742,188 B1 | 5/2004 | Del Castillo | |
| 7,330,812 B2 | 2/2008 | Ding | |
| 7,877,156 B2 * | 1/2011 | Fujimoto et al. | 700/94 |
| 2004/0024588 A1 | 2/2004 | Watson et al. | |
| 2004/0031058 A1 | 2/2004 | Reisman | |
| 2004/0247121 A1 | 12/2004 | Lee et al. | |
| 2005/0060053 A1 * | 3/2005 | Manish | 700/94 |
| 2006/0226298 A1 | 10/2006 | Pierson | |
| 2006/0256972 A1 * | 11/2006 | Roy et al. | 381/23 |
| 2007/0143801 A1 | 6/2007 | Madonna et al. | |
| 2007/0236449 A1 | 10/2007 | Lacroix et al. | |
| 2008/0212582 A1 | 9/2008 | Zwart et al. | |

FOREIGN PATENT DOCUMENTS

| | | |
|---|---|---|
| CA | 2030360 A | 7/1991 |
| CA | 2605490 y | 11/2006 |
| CA | 2606238 A | 11/2006 |

OTHER PUBLICATIONS

George S.Kang, Thomas M.Moran, David A. Heide, Hiding Information Under Speech, Dec. 12, 2005.*
International Search Report of International patent Application No. PCT/CA2009/001752.

* cited by examiner

*Primary Examiner* — Thai Tran
*Assistant Examiner* — Girumsew Wendmagegn
(74) *Attorney, Agent, or Firm* — Benoît & Côté

(57) ABSTRACT

There is described a method and device for encoding a vibro-kinetic signal (e.g., motion codes) directly onto a video player media (e.g., a DVD player) and for streaming the vibro-kinetic signal to a dedicated motion decoder in synchrony to the audio and video, while the movie support media (e.g., a DVD, a computer file, streaming data from a network) is being played. According to an embodiment, the multi-channel vibro-kinetic signal is encoded within one of the audio channels transported by the HDMI (High-Definition Multimedia Interface) link. Two methods are proposed to perform the encoding: Direct LSB (Least Significant Bit) Injection; and Perceptually Modulated Injection. There are also described corresponding decoding methods and motion decoders.

25 Claims, 7 Drawing Sheets

METHOD AND DEVICE FOR ENCODING VIBRO-KINETIC DATA ONTO AN LPCM AUDIO STREAM OVER AN HDMI LINK

CROSS-REFERENCE TO RELATED APPLICATIONS

This is the first application filed concerning the present description.

FIELD

The present description deals with home-theatre systems. More particularly, the description deals with the issues of storage, delivery and synchronization of a vibro-kinetic signal (i.e., motion and vibration) with audio and video signals in the home-theatre system environment.

BACKGROUND

In controlling motion platforms used in the home-theatre environment, there are challenges in the synchronization, storage and delivery of vibro-kinetic signal streams with audio streams and video streams. Solutions exist, but they are not necessarily well adapted for the home-theatre system environment.

The present description aims to propose solutions to the aforementioned challenges.

SUMMARY

According to an aspect, there is described a method and device for encoding a vibro-kinetic signal (e.g., motion codes) directly onto a video player transport or storage media (e.g., a DVD) and for streaming the vibro-kinetic signal to a dedicated motion decoder in synchrony to the audio and video, while the movie support media (e.g., a DVD, a computer file, streaming data from a network) is being played. Such a capability would enormously simplify the architecture of the motion decoder, lower its cost, and free it from some of the vulnerabilities of the present recognition and synchronization methods.

The present application describes a method to encode the multi-channel vibro-kinetic signal within one of the audio channels transported by the HDMI (High-Definition Multimedia Interface) link.

By encoding the vibro-kinetic signals on the movie support media in such a way that the corresponding binary data is streamed in real time on the HDMI link, the motion decoder does not need to store the vibro-kinetic data, and furthermore, it avoids the problem of having to synchronize the vibro-kinetic data to the audio stream. This greatly simplifies the architecture of the motion decoder and lowers its cost.

The method does not rely on HDMI infrastructure (HDMI Encoding or Decoding chips), protocols and specifications that do not yet exist.

According to the methods proposed herein, vibro-kinetic data is precisely synchronized with the audio. The level of synchronization between the vibro-kinetic data and the audio can be as tight as one audio sample.

According to an embodiment, there is provided a method for encoding vibro-kinetic data onto an original LPCM audio stream to be packaged and synchronized with a video stream which is to be read by a video player. The original LPCM audio stream comprises a plurality of LPCM audio channels. The vibro-kinetic data is for controlling a motion platform through a motion decoder. The method comprises: obtaining a succession of blocks of vibro-kinetic samples from a vibro-kinetic file; constructing a vibro-kinetic packet with each block of vibro-kinetic samples, the vibro-kinetic packet comprising a given number of bits, the bits representing at least a portion of the vibro-kinetic data; obtaining a series of original LPCM samples from at least one of the audio channels from the original LPCM audio stream; replacing at least the Least Significant Bit (LSB) of each LPCM sample of the series of original LPCM samples with a different one of the given number of bits of the vibro-kinetic packet to produce LPCM samples with encoded vibro-kinetic data; and assembling a given number of LPCM samples with encoded vibro-kinetic data to reconstitute an LPCM audio channel which thereby includes the vibro-kinetic data for controlling the motion platform, the LPCM audio channel for being transported over a digital link between the DVD player and the motion decoder.

According to an embodiment, there is provided a method for modulating vibro-kinetic data onto an original LPCM audio stream to be packaged and synchronized with a video stream which is to be read by a video player. The original LPCM audio stream comprises a plurality of LPCM audio channels. The vibro-kinetic data for controlling a motion platform through a motion decoder. The method comprises: obtaining vibro-kinetic samples from a vibro-kinetic file, the vibro-kinetic samples comprising the vibro-kinetic data; obtaining a series of original LPCM audio samples from at least one of the audio channels from the original LPCM audio stream; modulating the vibro-kinetic data according to the LPCM audio samples using a perceptual distance criterion to produce a modulated signal in the audio band such that the detectability of the modulated signal within the audio signal is minimized; and producing an output LPCM audio channel by adding the modulated signal to the original LPCM audio channel, the output LPCM audio channel thereby includes the vibro-kinetic data for controlling the motion platform, the output LPCM audio channel for being transported over a digital link between the DVD player and the motion decoder.

According to an embodiment, there is provided a method for decoding, in real time, a stream of multi-channel vibro-kinetic data encoded in LPCM audio channels. The multi-channel vibro-kinetic data being for controlling a motion platform. The method comprises: receiving the LPCM audio channels with encoded vibro-kinetic data; constructing a bit stream with the Least Significant Bits of audio samples from the LPCM audio channels; parsing the bit stream and detecting a sync field; decoding and validating a vibro-kinetic packet; extracting vibro-kinetic samples from the vibro-kinetic packet; and outputting the vibro-kinetic samples to the motion platform.

According to an embodiment, there is provided a method for demodulating, in real time, a multi-channel vibro-kinetic signal modulated in audio channels. The multi-channel vibro-kinetic data being for controlling a motion platform. The method comprises: receiving the LPCM audio channels with modulated vibro-kinetic data; detecting, demodulating and validating vibro-kinetic data from the audio channels; extracting the vibro-kinetic samples from the vibro-kinetic data; and outputting the vibro-kinetic samples to the motion platform.

According to an embodiment, there is provided a motion decoder for decoding, in real time, a multi-channel vibro-kinetic signal included in an LPCM audio stream. The home-theatre audio stream comprising two or more LPCM audio channels. The multi-channel vibro-kinetic signal being for controlling a motion platform. The motion decoder comprises: a receiver for receiving and reading the LPCM audio; a processor for parsing, decoding and validating vibro-kinetic packets from the LPCM audio channels; and for decoding the vibro-kinetic samples from the vibro-kinetic packets; and an output for outputting the vibro-kinetic samples forming a vibro-kinetic signal used to control the motion platform.

According to an embodiment, there is provided a motion decoder for demodulating, in real time, a multi-channel vibro-kinetic signal included in an LPCM audio stream. The home-theatre audio stream comprising two or more LPCM audio channels. The multi-channel vibro-kinetic signal being for controlling a motion platform. The motion decoder comprises: a receiver for receiving and reading the LPCM audio; for detecting, demodulating and validating vibro-kinetic data from the audio signal and for extracting the vibro-kinetic samples from the vibro-kinetic data; and an output for outputting the vibro-kinetic samples forming a vibro-kinetic signal used to control the motion platform.

DETAILED DESCRIPTION

For simplification of the present text, the present description often refers to a DVD or a DVD player. It is understood that any other type of movie support media (e.g., electrical, optical, HD DVD, any type of memory, streaming data, etc.) and any other type of player (i.e., movie player) for such support media (e.g., computer, network, computer used as a multimedia player, etc.) are intended to be included in this description and within the scope of the invention.

Figure 1:
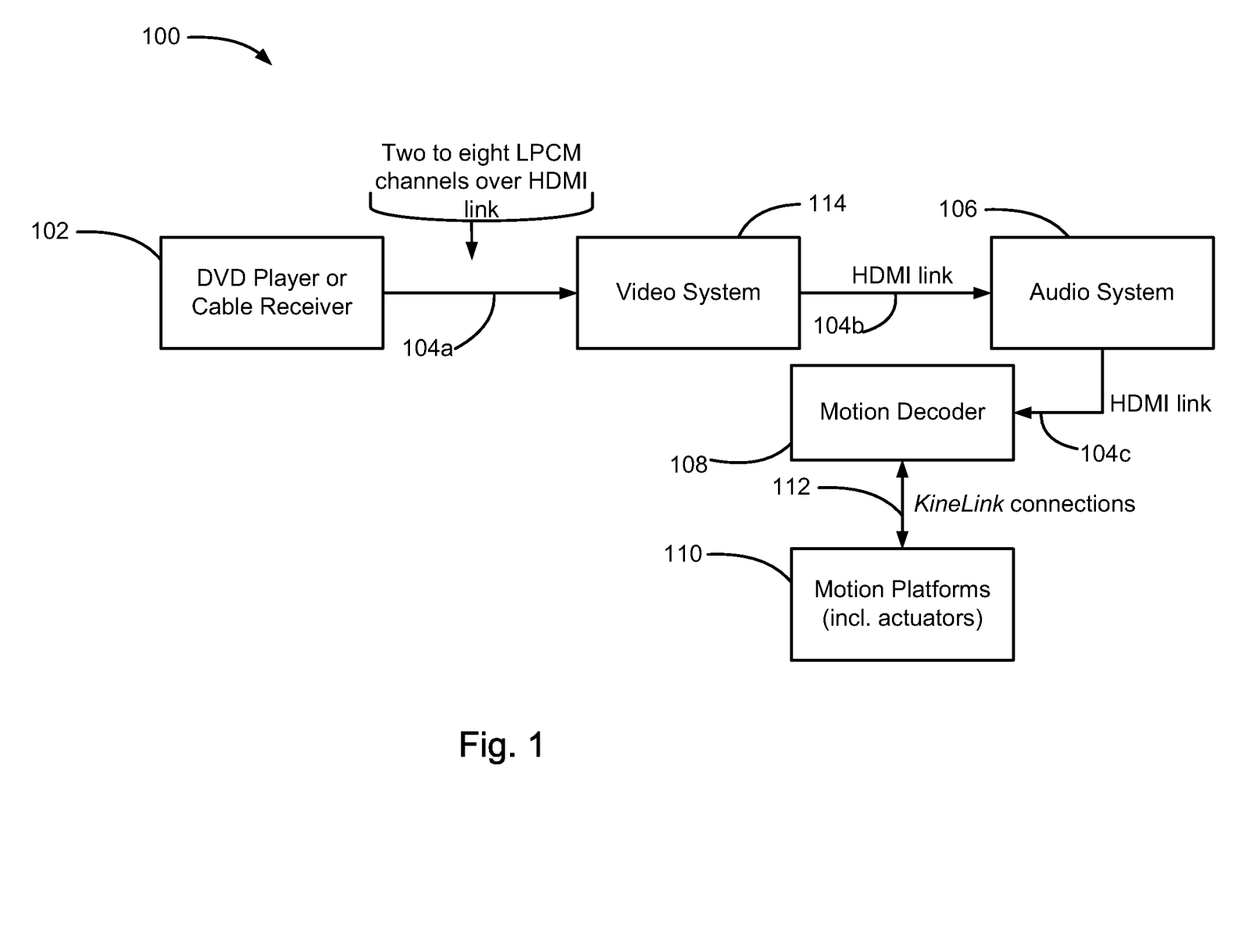
FIG. 1 is a block diagram showing a portion of a home-theatre system including a motion decoder according to an embodiment of the invention.

Referring to FIG. 1, a portion of a home-theatre system 100 is shown. The home-theatre system 100 comprises a DVD player or cable receiver 102 connected to video system 114 using an HDMI link 104*a*. The video system 114 comprises an HDMI receiver (not shown) which receives LPCM audio channels over the HDMI link 104*a*. The video system 114 also includes an HDMI repeater (not shown) which serves to forward to the next piece of equipment down the line the same LPCM audio channels which were received by the HDMI receiver.

In the embodiment illustrated in FIG. 1, the video system 114 is connected to the audio system 106 using HDMI link 104*b*. The audio system 106 is connected to the motion decoder 108 through HDMI link 104*c*. Both the audio system 106 and the motion decoder 108 have an HDMI receiver (not shown) and an HDMI repeater (not shown) which provide the same basic functionality as the HDMI receiver and the HDMI repeater of the video system 114. A person skilled in the art will understand that the order in which the video system 114, the audio system 106 and the motion decoder 108 are connected from the DVD player or cable receiver 102 may vary.

It should also be noted that, although the video system 114, the audio system 106 and the motion decoder 108 are shown as separate entities, they may be part of the same entity or may individually be part of other devices. For example, the audio system 106 may be part of a display device.

The motion decoder 108 is further connected to a number of motion platforms 110 using two-way KineLink connections 112.

KineLink is the name of the proprietary and specialized protocol used to transport the vibro-kinetic signal from the motion decoder 108 to the motion platforms 110. Motion Code™ or Motion FX represents the content of the multi-channel vibro-kinetic signal that is encoded and delivered to the motion platforms 110.

In home-theatre systems, the audio may be transported over HDMI links 104, usually as linear PCM audio. This specification describes a way to encode vibro-kinetic data onto an LPCM audio stream so that it can be transported over an HDMI output of a DVD player.

Transporting the vibro-kinetic signal over HDMI link 104*a*, 104*b*, 104*c* has the advantage of being inherently and precisely synchronous to the audio. It is a stable fast and reliable transport that is relatively inexpensive to implement.

In a proposed configuration, the HDMI link 104*a*, 104*b*, 104*c* transports the vibro-kinetic signal embedded (encoded) in a linear PCM audio channel. The motion decoder 108 is connected to the HDMI link 104*a*, 104*b*, 104*c* of the DVD player or cable receiver 102. The motion decoder 108 decodes the vibro-kinetic signal on the HDMI link 104*a*, 104*b*, 104*c*, and plays it to downstream motion platforms 110 or KineLink repeaters (KineHubs) (not shown). In an embodiment, a motion platform 110 includes four actuators.

Audio Data Processing. Between its creation and its playback on the user's audio system 106, the audio part of the DVD content goes through the following processing steps: 1) the audio channels are created. There may be 2 to 8 LPCM (Linear Pulse Code Modulation) channels, with a bit depth of 16 to 24 bits, and a sampling rate of 48, 96, or 192 kHz; 2) the audio channels may be compressed using one of a group of standard IEC61937 compression algorithms. Some of these algorithms may be lossless (allow a bit-exact play-back of the original LPCM audio channels). Compression is optional; and 3) the audio channels are packaged with the video into a set of files that constitute the DVD content. The DVD is created with this content.

During DVD playback the audio is read by the DVD player 102 from the DVD.

If the audio is stored compressed on the DVD, it may be decompressed before HDMI encoding for transport as LPCM within the HDMI link 104. If the audio is stored uncompressed on the DVD it could in principle be compressed in real-time for transport as IEC61937 over the HDMI link 104. Alternately audio stored as an IEC61937 encoding on the DVD can be streamed "as-is" on the HDMI link 104, and of course audio that is stored uncompressed on the DVD may be streamed as uncompressed LPCM on the HDMI link 104. All combinations are possible in principle.

The DVD player or cable receiver 102 itself may add processing to the audio, such as for instance:

Adding button sounds;
Adding linear filtering to the audio (room acoustics, bass-treble, equalization . . . etc.);
Scaling the audio (volume);
Channel up/down mix; and/or
Other linear or non-linear processes.

The audio is therefore transported over the HDMI link 104a, 104b, 104c as compressed IEC61937, or multi-channel LPCM audio.

Any one of the HDMI receivers may pass on the audio unchanged to downstream equipment, or may modify it (for instance adding signal processing) before passing it on to downstream equipment.

In principle if the Motion Decoder 108 is the first equipment downstream of the DVD player or cable receiver 102, it has the best chance of receiving the binary audio data exactly as it is stored on the DVD. However, even this is not assured in the current architecture because: a) The DVD player itself can modify the audio stream, adding one or a combination of the processes discussed above; and b) The original LPCM audio may be encoded using a non-bit-exact (lossy) compression algorithm, even before being stored on the DVD.

How much of these vulnerabilities constitute real risks, given the present practices of the industry, still needs to be assessed. Also, it should be mentioned that the techniques presented herein require the collaboration of several key players in the industry. Most obviously the movie studios (e.g., production houses), but also the authoring companies, and possibly DVD player manufacturers.

Kinelink-Over-HDMI. According to an embodiment, the vibro-kinetic data is encoded within one or several LPCM audio channels, in such a way that it is: a) Present in the DVD content; b) Present in the HDMI stream when the DVD is being played; c) Undetectable to the human ear when the audio channel(s) is played over a audio system; and d) Decodable by a specially designed Motion Decoder 108.

The techniques used to perform this encoding take advantage of the much larger bandwidth available for the representation and transport of the audio channels than what is required to represent and transport the vibro-kinetic data. One 16-bit 48 kHz LPCM monophonic audio channel has 30 times the bandwidth required to transport the four channels of the vibro-kinetic data.

Two methods are proposed to perform the encoding: a) Direct LSB (Least Significant Bit) Injection is easier to implement at the encoder and decoder level, but it has some vulnerabilities as identified below; and b) Perceptually Modulated Injection has a potentially lesser transparency than Direct LSB Injection, and is more complex to implement, but is more robust to the vulnerabilities presented below.

Direct LSB Injection. Direct LSB Injection (DLI) consists of using the Least Significant Bit of one of the audio channels (the Low-Frequency-Effect channel for instance) to encode and transport the vibro-kinetic data. Each LSB of each LPCM sample is used to transport one bit of the encoded vibro-kinetic data. The single-bit bit-stream is constructed in order to be easy to detect and decode. It is built as a succession of packets, each packet representing a single KineLink block. One KineLink block represents a set of 4 coordinates for the corresponding sampling period (2.5 ms).

Assuming that the LPCM audio channel is sampled at 48 kHz, one KineLink block must be transported every 2.5 ms or 120 LPCM samples. The KineLink block is therefore transported as a packet of 120 bits. The packet is constructed as follows:

TABLE 1

Packet construction

| Field | Width | Content |
|---|---|---|
| Sync | 24-bit | 0xAA55AA |
| Preamble | 16-bit | 0xD87A -> Active KineLink Stream<br>0xD87B -> Standby KineLink Stream<br>0xD88A -> Active KineLink Stream with 1g preemphasis |
| KineLink Frame | 4 × 16-bit | 4 × 16-bit samples of one KineLink block. The samples are transmitted in the following order:<br>0 Front-Right<br>1 Front-Left<br>2 Rear-Right<br>3 Rear Left |
| Checksum | 16-bit | |

The sync field is designed to allow the motion decoder 108 to lock onto the beginning of the packet with very little ambiguity. This ambiguity is even less when considering that the following preamble only takes one of 3 possible values.

The combination of the sync and preamble fields allows the motion decoder 108 to detect the beginning of a block with very little ambiguity. In addition the preamble provides information about the state of the KineLink stream, and when it is active if the KineLink samples have been encoded with 1 g preemphasis or not.

The 1 g pre-emphasis is such that the KineLink signal represents an acceleration rather than a position in the frequency range 6 Hz to 100 Hz. This is done for two reasons: a) The full 16-bit dynamic range of the KineLink signal can be used on the whole frequency range with no risk of saturating the actuators in acceleration; and b) The impression of "force" of the vibration signal is much more closely related to acceleration than to position. Therefore acceleration signals of equal amplitude are perceived with the same force irrespective of their frequency. The perceived force of position signals on the other hand increases with increasing frequency.

When the KineLink signal is encoded with the 1 g pre-emphasis, either the motion decoder 108 or the actuators themselves (of the motion platform 110) must apply a de-emphasis filter.

The checksum is calculated by: a) Adding together the 4 KineLink words and the preamble, with 16-bit wrap-around arithmetic; and b) Taking the two's complement of the result.

This way the addition of the checksum and the 5 words appearing before it with wrap-around arithmetic should give zero. Since the size of the packet is fixed, many vulnerabilities of such a checksum do not apply. This checksum is very easy to implement and still offers a good protection against many typical transmission errors.

Packet Framing. At the level of the motion decoder 108, a packet is accepted whenever: a) The sync field is detected; b) One of the 3 possible preamble values is detected at the proper field position; c) The checksum is detected at the proper field position and its value is valid; and d) The previous packet has been decoded and so validated.

This way there is very little chance of a random bit sequence being wrongly decoded as a KineLink packet. The decoder takes advantage of the packet construction and the exact packet frequency to insure that the decoded data is indeed KineLink data.

If the motion decoder 108 loses synchronization with the KineLink bit stream, it will attempt to first find a new sync field by parsing the LPCM audio stream LSB by LSB. Whenever it finds a valid sync field, it will proceed to parse and validate the rest of the packet. A packet will only be validated after two consecutive packets (itself and the preceding one) are completely decoded.

Alternate Sampling Frequencies. In case a sampling frequency greater than 48 kHz is used, the following bits may be padded with random data, or may contain the original bit values (the LPCM bit values prior to the addition of the KineLink data). This may help in concealing the KineLink data within the LPCM audio.

Audibility of the KineLink Packet. When the bit depth of the LPCM audio stream is 16-bit, the audibility of the KineLink packets will be exceedingly low. When the LPCM audio is encoded using 20-bit or 24-bit samples, the inaudibility of the KineLink packets will be assured.

Vulnerabilities of Direct LSB Injection. DLI relies on the fact that the data transported on the HDMI link is a bit-exact version of the LPCM audio data used to create the audio content. Any modification, as slight as it may be, would corrupt the stream in a way that would render it unrecognizable to the KineLink decoder. In particular, the DVD player sees the KineLink data as PCM audio. It may "take liberties" with it, such as: a) Adding button sounds; b) Adding linear filtering to the audio (room acoustics, bass-treble, equalization . . . etc.); c) Scaling the audio (volume); d) Up/Down mix; and/or e) Other linear or non-linear processes.

Any of such modification would corrupt the KineLink packet so that it is unrecognizable to the motion decoder.

In the case where the audio is compressed on the DVD, for instance as an IEC61937 format such (AC3, DTS, etc.) it may be impossible to insure a perfect control over the LSB of the decoded LPCM audio samples. The compression scheme may alter the audio such that the decompressed audio signal is not a bit-exact version of the original. The only exception is when a lossless compression algorithm is employed. With Blue-ray, lossless encoding seems to be more and more the norm however.

Any piece of equipment placed in the HDMI chain between the DVD player and the motion decoder has the potential to modify the audio. In particular equalizers, audio processors and the like have a great chance of causing problems even on the LFE channel.

Perceptually Modulated Injection. Perceptually Modulated Injection (PMI) is very similar to DLI except that it: a) Provides a modulation of the vibro-kinetic data in such a way that it is perceptually inaudible (concealed) within the LPCM audio stream. This modulation technique is based on a perceptually relevant distance measure and is similar to techniques used for digital audio watermarking; that is, the vibro-kinetic data is modulated such that the detectability of the vibro-kinetic data within the modulated signal is minimized. PMI introduces the vibro-kinetic data in the audio channel. The PMI technique takes advantage of the very large bandwidth available for the transport of the linear PCM stream, and trade-off this bandwidth for increased robustness to the vulnerabilities of DLI; b) Optionally uses more than one channel of the audio content, for added bandwidth and better concealment; and c) Optionally provides a compression (for instance, DPCM (Differential Pulse Code Modulation), Linear Prediction, Vector Quantization, etc.) of the KineLink data to minimize the bandwidth required for the transport of the vibro-kinetic signal.

Such perceptually concealed modulation techniques are not perfect, and even though the amount of noise added to the audio signal may be very difficult to detect, it is not generally considered transparent. In comparison, using the LSB of a 20-bit or 24-bit representation to encode the vibro-kinetic signal would be completely inaudible. However, PMI would be much more robust to many processing steps that may be implemented along the audio signal chain.

Figure 2:
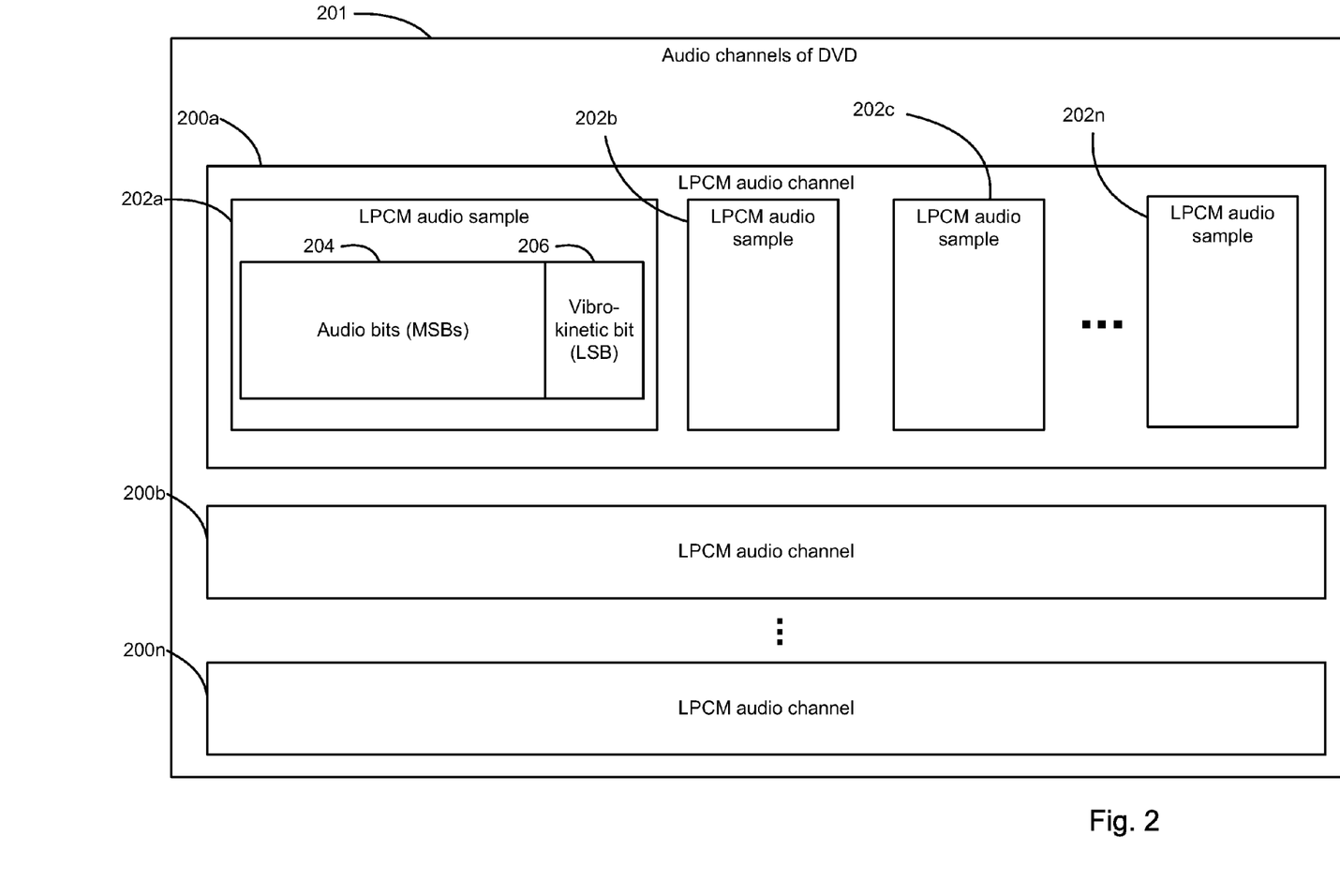
FIG. 2 is a schematic representation of an audio bundle of a home-theatre file built according to an embodiment of the invention.

Now referring to FIG. 2, there is shown a schematic representation of the audio bundle of audio channels on a DVD used in an embodiment of the invention and produced according to the method of FIG. 3 further discussed below. The audio channels 201 of a DVD comprise a set of monophonic LPCM channels (200a, 200b, 200n). One of the monophonic LPCM channels (200a) is shown as comprising a series of LPCM audio samples 202a, 202b, 202c, 202n. The most significant bits (MSBs) 204 of the LPCM audio sample 200a are reserved for audio data while the least significant bit (LSB) 206 is reserved for vibro-kinetic data. According to another embodiment, more than one bit is reserved for the vibro-kinetic data. According to another embodiment, more than one LPCM channel comprises LPCM audio samples which are encoded with vibro-kinetic data.

Figure 3:
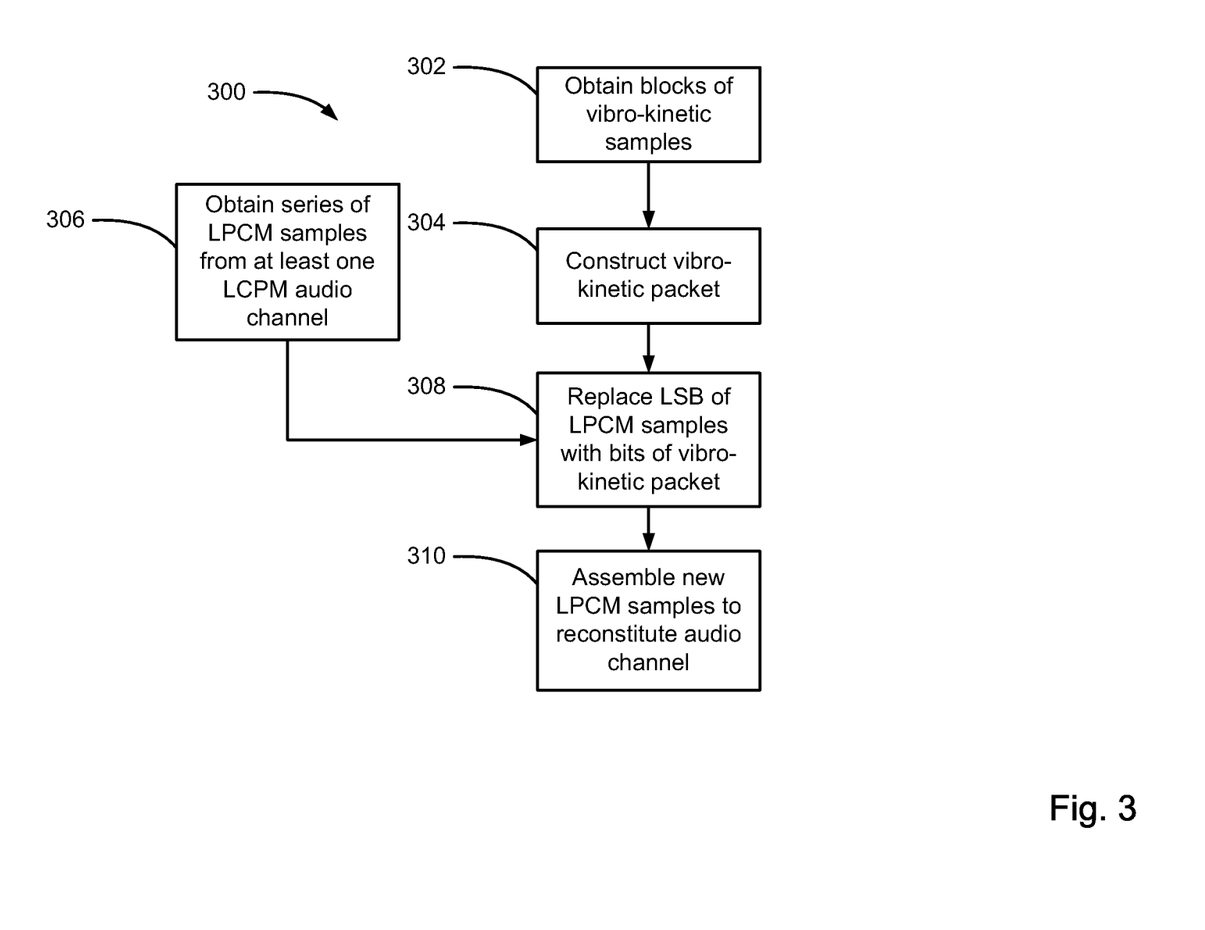
FIG. 3 is a flow chart of the method for encoding vibro-kinetic data onto an LPCM (Linear Pulse Code Modulation) audio channel for being transported over a digital link between the DVD (Digital Video Disc) player and the motion decoder according to an embodiment of the invention.

Now referring to FIG. 3, there is shown a method 300 for encoding vibro-kinetic data onto an original LPCM audio stream according to an embodiment of the invention. The original LPCM audio stream will eventually be packaged and synchronized with a video stream. The video stream will eventually be read by a video player. The original LPCM audio stream comprises a plurality of LPCM audio channels. The last two steps, individually or in combination, are meant to be part of various embodiments of the invention. As discussed earlier, the vibro-kinetic data is for controlling a motion platform through a motion decoder. The method 300 comprises: obtaining a succession of blocks of vibro-kinetic samples from a vibro-kinetic file (step 302); constructing a vibro-kinetic packet with each block of vibro-kinetic samples, the vibro-kinetic packet comprising a given number of bits, the bits comprising at least a portion of the vibro-kinetic data. The given number of bits may also include synchronisation and framing information and redundancy data (step 304); obtaining a series of original LPCM samples from at least one of the audio channels from the original LPCM audio stream (step 306); replacing at least the Least Significant Bit (LSB) of each LPCM sample of the series of original LPCM samples with a different one of the given number of bits of the vibro-kinetic packet to produce encoded LPCM samples (step 308); and assembling a given number of encoded LPCM samples to reconstitute an encoded LPCM audio channel which thereby includes the vibro-kinetic data for controlling the motion platform, the encoded LPCM audio channel for being transported over a digital link between the DVD player and the motion decoder (step 310).

Figure 4:
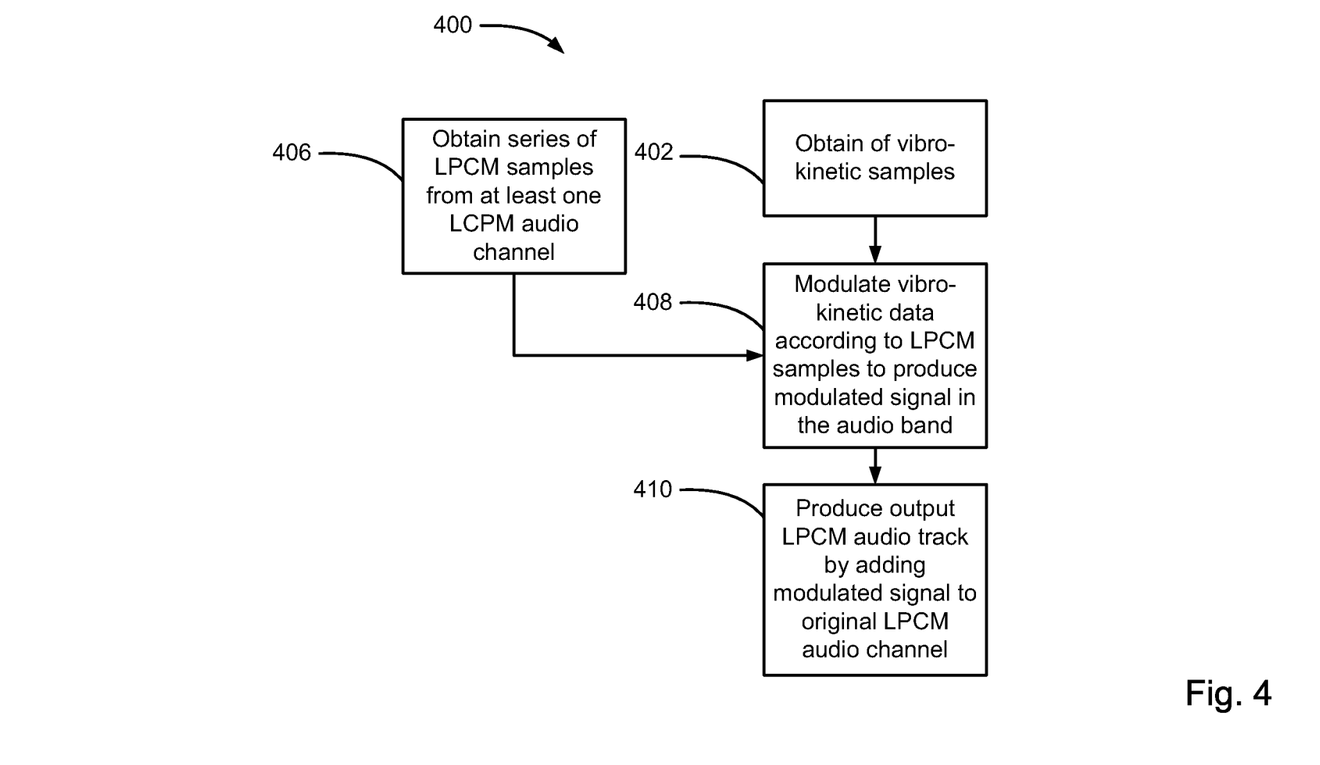
FIG. 4 is a flow chart of the method for modulating vibro-kinetic data onto an LPCM audio channel for being transported over a digital link between the DVD player and the motion decoder according to another embodiment of the invention.

Now referring to FIG. 4, there is shown a method 400 for modulating vibro-kinetic data onto an original LPCM audio stream according to another embodiment of the invention. The original LPCM audio stream will eventually be packaged and synchronized with a video stream. The video stream will eventually be read by a video player. The original LPCM audio stream comprises a plurality of LPCM audio channels. The last two steps, individually or in combination, are meant to be part of various embodiments of the invention. As discussed earlier, the vibro-kinetic data is for controlling a motion platform through a motion decoder. The method 400 comprises: obtaining vibro-kinetic samples from a vibro-kinetic file, the vibro-kinetic samples comprising the vibro-kinetic data (step 402); obtaining a series of original LPCM audio samples from at least one of the audio channels from the original LPCM audio stream (step 406); modulating the vibro-kinetic data according to the LPCM audio samples using a perceptual distance criterion to produce a modulated signal in the audio band such that the detectability of the modulated signal within the audio signal is minimized (step 408); and producing an output LPCM audio channel by adding the modulated signal to the original LPCM audio channel. The output LPCM audio channel thereby includes the vibro-kinetic data for controlling the motion platform. The output LPCM audio channel is for being transported over a digital link between the video player and the motion decoder (step 410). In other embodiments, the link between the video player and the motion decoder could be analog.

Figure 5:
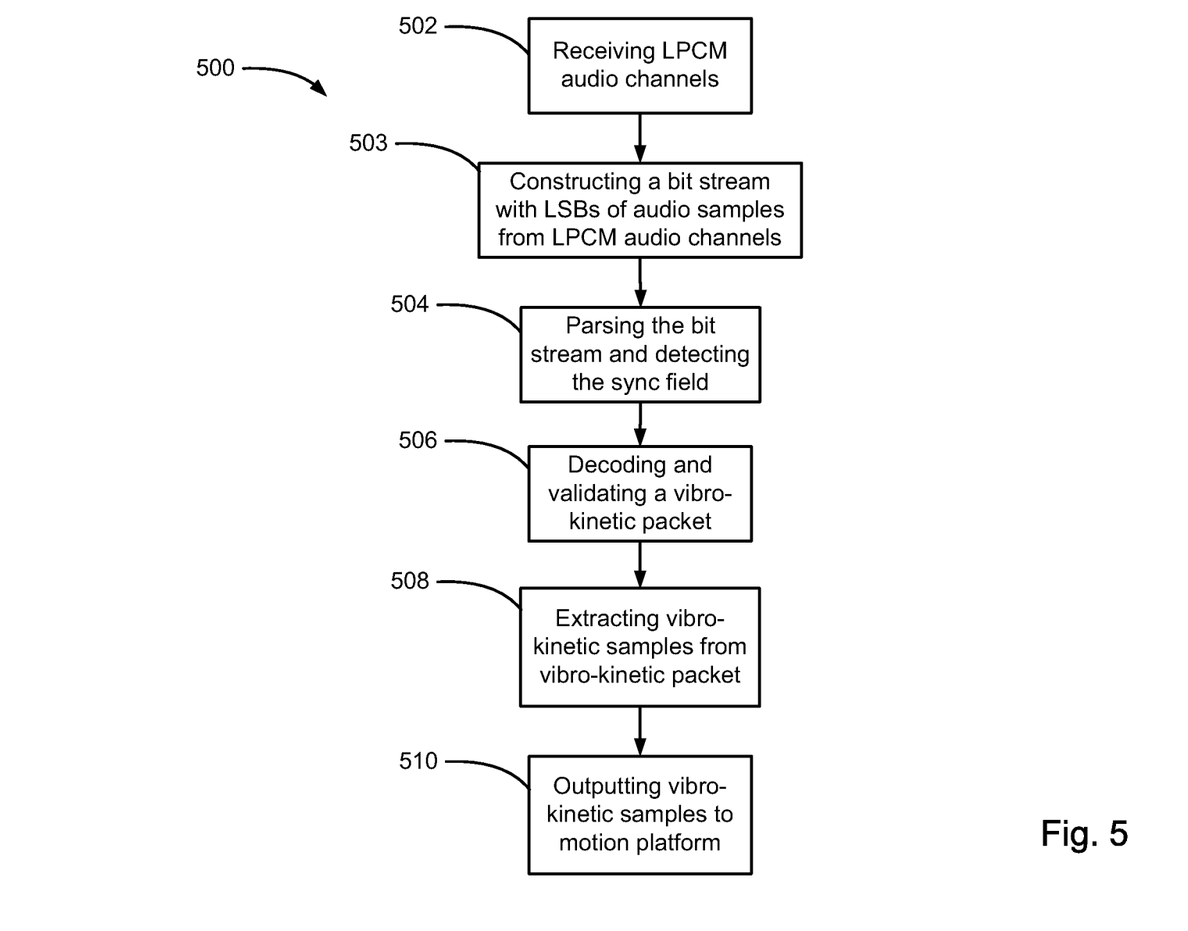
FIG. 5 is a flow chart of a method for decoding, in real time, the multi-channel vibro-kinetic signal included in a home-theatre audio stream according to an embodiment of the invention.

Now referring to FIG. 5, there is shown a method 500 for decoding, in real time, a stream of multi-channel vibro-kinetic data encoded in LPCM audio channels according to an embodiment of the invention. The multi-channel vibro-kinetic signal is for controlling a motion platform. The method comprises: receiving the LPCM audio channels with encoded vibro-kinetic data (step 502); constructing a bit stream with the Least Significant Bits of audio samples from the LPCM audio channels (step 503); parsing the bit stream and detecting the sync field (step 504); decoding and validating a vibro-kinetic packet (step 506); extracting vibro-kinetic samples from the vibro-kinetic packet (step 508); and outputting the vibro-kinetic samples to the motion platform (step 510). The vibro-kinetic samples can then be used to control the motion platform.

Figure 6:
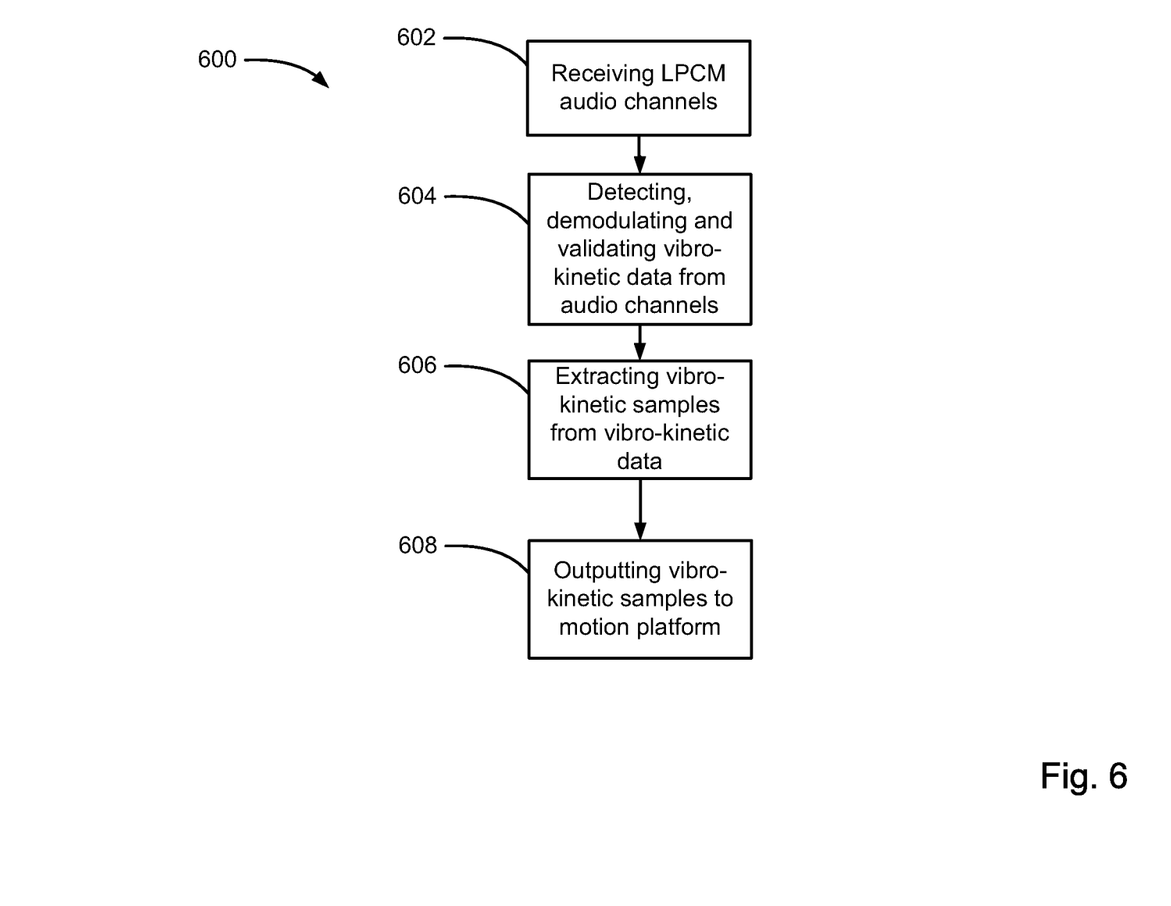
FIG. 6 is a flow chart of a method for demodulating, in real time, the multi-channel vibro-kinetic signal included in a home-theatre audio stream according to another embodiment of the invention.

Now referring to FIG. 6, there is shown a method 600 for demodulating, in real time, a multi-channel vibro-kinetic signal modulated in audio channels according to an embodiment of the invention. The multi-channel vibro-kinetic signal is for controlling a motion platform. The method comprises: receiving the LPCM audio channels with modulated vibro-kinetic data (step 602); detecting, demodulating and validating vibro-kinetic data from the audio channels (step 604); extracting the vibro-kinetic samples from the vibro-kinetic data (606); and outputting the vibro-kinetic samples to the motion platform (step 608). The vibro-kinetic samples can then be used to control the motion platform.

Figure 7:
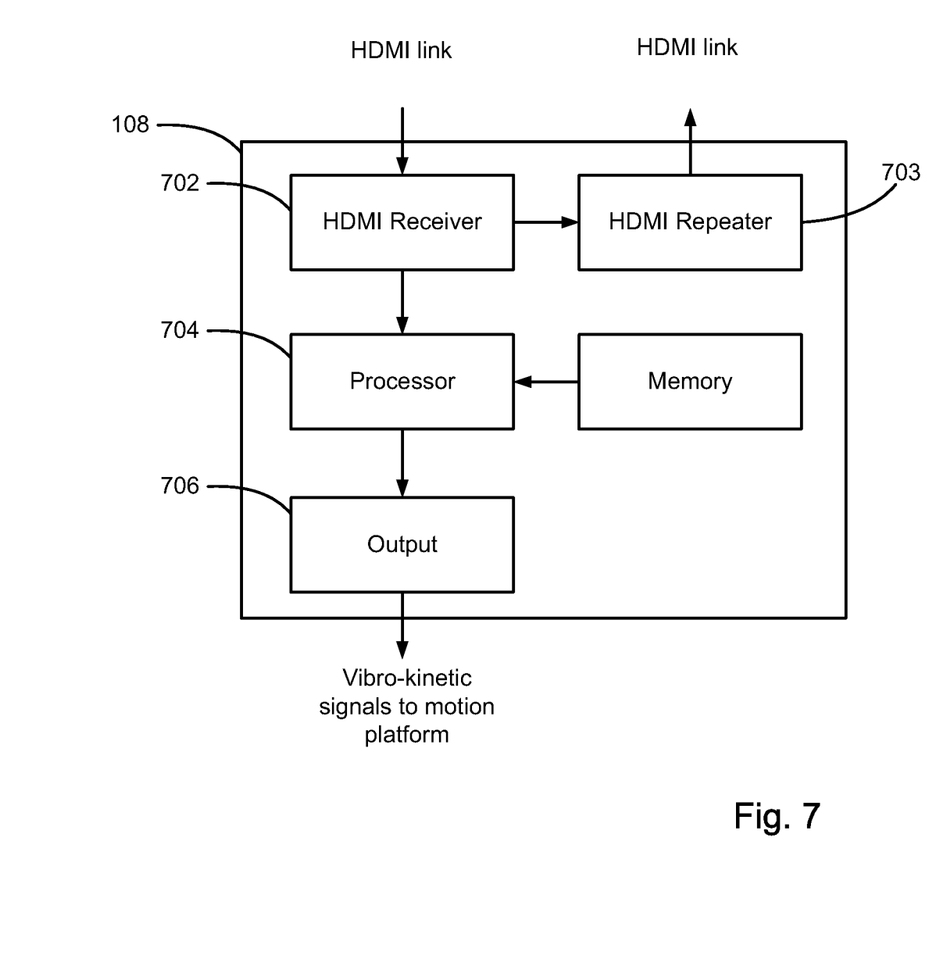
FIG. 7 is a block diagram of a motion decoder for decoding or demodulating in real time the multi-channel vibro-kinetic signal included in a home-theatre audio stream according to an embodiment of the invention.

Now referring to FIG. 7, there is shown a block diagram of a motion decoder 108 for decoding, in real time, a multi-channel vibro-kinetic signal included in a home-theatre audio stream (i.e., audio channels). Each home-theatre audio stream comprises two or more LPCM audio channels. The multi-channel vibro-kinetic signal for controlling a motion platform. The motion decoder comprises: an HDMI receiver 702 for reading/receiving the HDMI stream and for extracting therefrom the LPCM audio channels; an HDMI repeater 703 for forwarding the HDMI stream to downstream equipment; a processor 704 for parsing, decoding and validating vibro-kinetic packets from the LPCM audio channels; and for decoding the vibro-kinetic samples from the vibro-kinetic packets; and an output 706 for outputting the vibro-kinetic samples forming a vibro-kinetic signal used to control the motion platform.

According to another embodiment, the processor 704 is for detecting, demodulating and validating vibro-kinetic data from the audio signal and for extracting the vibro-kinetic samples from the vibro-kinetic data.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A method for encoding vibro-kinetic data onto an original LPCM audio stream to be packaged and synchronized with a video stream which is to be read by a video player, the original LPCM audio stream comprises a plurality of LPCM audio channels, the vibro-kinetic data for controlling a motion platform through a motion decoder, the method comprising:

obtaining a succession of blocks of vibro-kinetic samples from a vibro-kinetic file;

constructing a vibro-kinetic packet with each block of vibro-kinetic samples, the vibro-kinetic packet comprising a given number of bits, the bits representing at least a portion of the vibro-kinetic data;

obtaining a series of original LPCM samples from at least one of the audio channels from the original LPCM audio stream;

replacing at least the Least Significant Bit (LSB) of each LPCM sample of the series of original LPCM samples with a different one of the given number of bits of the vibro-kinetic packet to produce LPCM samples with encoded vibro-kinetic data; and assembling a given number of LPCM samples with encoded vibro-kinetic data to reconstitute an LPCM audio channel which thereby includes the vibro-kinetic data for controlling the motion platform, the LPCM audio channel for being transported over a digital link between the DVD player and the motion decoder.

2. The method of claim 1, further comprising packaging the encoded LPCM audio stream with the video stream to form part of content of a DVD.

3. The method of claim 2, further comprising creating a DVD using the content.

4. The method of claim 3, further comprising reading the DVD content using the DVD player.

5. The method of claim 4, further comprising reading the vibro-kinetic data using the motion decoder.

6. The method of claim 5, further comprising controlling the motion platform using the vibro-kinetic data read by the motion decoder.

7. The method of claim 1, wherein the digital link comprises an HDMI link.

8. The method of claim 7, further comprising compressing the LPCM audio channels using a compression algorithm.

9. The method of claim 8, wherein the compression algorithm comprises an IEC61937 algorithm.

10. The method of claim 1, wherein the LSB comprises more than one bit.

11. A method for modulating vibro-kinetic data onto an original LPCM audio stream to be packaged and synchronized with a video stream which is to be read by a video player, the original LPCM audio stream comprises a plurality of LPCM audio channels, the vibro-kinetic data for controlling a motion platform through a motion decoder, the method comprising:

obtaining vibro-kinetic samples from a vibro-kinetic file, the vibro-kinetic samples comprising the vibro-kinetic data;

obtaining a series of original LPCM audio samples from at least one of the audio channels from the original LPCM audio stream;

modulating the vibro-kinetic data according to the LPCM audio samples using a perceptual distance criterion to produce a modulated signal in the audio band such that the detectability of the modulated signal within the audio signal is minimized; and producing an output LPCM audio channel by adding the modulated signal to the original LPCM audio channel, the output LPCM audio channel thereby includes the vibro-kinetic data for controlling the motion platform, the output LPCM audio channel for being transported over a digital link between the DVD player and the motion decoder.

12. The method of claim 11, further comprising packaging the encoded LPCM audio stream with the video stream to form part of content of a DVD.

13. The method of claim 12, further comprising creating a DVD using the content.

14. The method of claim 13, further comprising reading the DVD content using the DVD player.

15. The method of claim 14, further comprising reading the vibro-kinetic data using the motion decoder.

16. The method of claim 15, further comprising controlling the motion platform using the vibro-kinetic data read by the motion decoder.

17. The method of claim 11, wherein the digital link comprises an HDMI link.

18. The method of claim 17, further comprising compressing the vibro-kinetic data prior to its modulation into LPCM audio channels using a compression algorithm.

19. The method of claim 18, wherein the compression algorithm comprises one of a DPCM algorithm, a Linear Prediction algorithm, and a Vector Quantization algorithm.

20. The method of claim 11, further comprising compressing the LPCM audio channels using a compression algorithm.

21. The method of claim 20, wherein the compression algorithm comprises an IEC61937 algorithm.

22. A method for decoding, in real time, vibro-kinetic data encoded in a stream of LPCM audio channels, the multi-channel vibro-kinetic data being for controlling a motion platform, the method comprising:
receiving the stream of LPCM audio channels with encoded vibro-kinetic data;
detecting one or more LPCM audio channels carrying vibro-kinetic data, from the stream of LPCM audio channels;
extracting the Least Significant Bit of each LPCM sample of each LPCM audio channel carrying vibro-kinetic data;
constructing a bit stream of vibro-kinetic data with the extracted Least Significant Bits;
parsing the bit stream and detecting a sync field;
using said bit stream decoding and validating a vibro-kinetic packet;
extracting vibro-kinetic samples from the vibro-kinetic packet; and
outputting the vibro-kinetic samples to the motion platform.

23. A method for demodulating, in real time, a multi-channel vibro-kinetic signal modulated in audio channels, the multi-channel vibro-kinetic data being for controlling a motion platform, the method comprising:
receiving LPCM audio channels with modulated vibro-kinetic data;
detecting a vibro-kinetic signal modulated using a perceptual distance criterion in the LPCM audio channels;
demodulating the vibro-kinetic signal to extract the vibro-kinetic data;
constructing vibro-kinetic samples from the extracted vibro-kinetic data; and
outputting the vibro-kinetic samples to the motion platform.

24. A motion decoder for decoding, in real time, vibro-kinetic data encoded in a stream of LPCM audio channels, the vibro-kinetic data being for controlling a motion platform, the motion decoder comprising:
a receiver for receiving and reading the stream of LPCM audio channels;
a processor adapted to:
detect one or more LPCM audio channels carrying vibro-kinetic data, from the stream of LPCM audio channels;
extract the Least Significant Bit of each LPCM sample of each LPCM audio channel carrying vibro-kinetic data;
construct a bit stream of vibro-kinetic data with the extracted Least Significant Bits;
parse the bit stream and detect a sync field;
decode and validate a vibro-kinetic packet using said bit stream; and
extract vibro-kinetic samples from the vibro-kinetic packet; and
an output for outputting the vibro-kinetic samples to the motion platform.

25. A motion decoder for demodulating, in real time, a multi-channel vibro-kinetic signal included in an LPCM audio stream, the home-theatre audio stream comprising two or more LPCM audio channels, the multi-channel vibro-kinetic signal being for controlling a motion platform, the motion decoder comprising:
a receiver for receiving and reading the LPCM audio channels;
a processor adapted to detect a vibro-kinetic signal modulated using a perceptual distance criterion in the LPCM audio channels, demodulate the vibro-kinetic signal to extract the vibro-kinetic data, and construct vibro-kinetic samples from the extracted vibro-kinetic data; and
an output for outputting the vibro-kinetic samples to the motion platform.

* * * * *